(12) United States Patent
Morrow

(10) Patent No.: US 9,084,308 B2
(45) Date of Patent: Jul. 14, 2015

(54) SELF CALIBRATING, ADAPTIVE SETPOINT DAYLIGHTING

(71) Applicant: Wayne Logan Morrow, Fort Lupton, CO (US)

(72) Inventor: Wayne Logan Morrow, Fort Lupton, CO (US)

(73) Assignee: Starfield Controls, Inc., Loveland, CO (US)

(*) Notice: Subject to any disclaimer, the term of this patent is extended or adjusted under 35 U.S.C. 154(b) by 0 days.

(21) Appl. No.: 13/888,131

(22) Filed: May 6, 2013

(65) Prior Publication Data

US 2013/0293113 A1   Nov. 7, 2013

Related U.S. Application Data

(60) Provisional application No. 61/643,406, filed on May 7, 2012.

(51) Int. Cl.
*H05B 37/02*   (2006.01)

(52) U.S. Cl.
CPC ............ *H05B 37/02* (2013.01); *H05B 37/0218* (2013.01); *H05B 37/0245* (2013.01); *Y02B 20/46* (2013.01)

(58) Field of Classification Search
USPC ............ 700/90, 291, 297; 315/149, 152, 308, 315/291, 158
See application file for complete search history.

(56) References Cited

U.S. PATENT DOCUMENTS

| | | | |
|---|---|---|---|
| 3,944,979 A | 3/1976 | Kwok | |
| 5,357,170 A | 10/1994 | Luchaco et al. | |
| 5,701,058 A * | 12/1997 | Roth | ............................. 315/158 |
| 5,978,364 A | 11/1999 | Melnik | |
| 6,084,231 A | 7/2000 | Popat | |
| 6,388,399 B1 | 5/2002 | Eckel et al. | |
| 6,510,995 B2 * | 1/2003 | Muthu et al. | .................. 235/454 |
| 6,583,573 B2 | 6/2003 | Bierman | |
| 7,019,276 B2 * | 3/2006 | Cloutier et al. | ......... 250/214 AL |
| 7,045,968 B1 | 5/2006 | Bierman et al. | |

(Continued)

FOREIGN PATENT DOCUMENTS

| EP | 0266213 | 5/1988 |
|---|---|---|
| EP | 2462781 | 3/2013 |

(Continued)

OTHER PUBLICATIONS

Wayne at al., High Performance Lighting Controls in Privae Office, Oct. 1998, World Workplace, pp. 1-9.*

(Continued)

*Primary Examiner* — Kidest Bahta
(74) *Attorney, Agent, or Firm* — Terrence M. Wyles, Esq.; Startup IP Law, LLC

(57) ABSTRACT

A method and means for creating a daylight harvesting controller with a self calibrating light sensor and an adaptive setpoint that maintains a user determined light level is disclosed herein. The system includes a light sensor for monitoring the ambient light level of a designated control zone and a means to receive and interpret light level adjustment commands created by a user or user surrogate. The system includes means to limit the setpoint to a maximum value, suspend daylighting activity when lights are being adjusted or are turned off, and to delay setpoint capture and the start or resumption of daylighting until an adjustment cycle is completed and the zone light sources have reached a nominally steady state.

17 Claims, 4 Drawing Sheets

System Deployment Diagram

(56) References Cited

U.S. PATENT DOCUMENTS

| | | | |
|---|---|---|---|
| 7,111,952 B2* | 9/2006 | Veskovic | 362/1 |
| 7,190,126 B1* | 3/2007 | Paton | 315/308 |
| 7,633,406 B2* | 12/2009 | Miki | 340/9.1 |
| 7,761,186 B2 | 7/2010 | Keller et al. | |
| 7,781,713 B2* | 8/2010 | Papamichael et al. | 250/205 |
| 7,839,017 B2 | 11/2010 | Huizenga et al. | |
| 7,884,732 B2 | 2/2011 | Huizenga | |
| 7,903,596 B2 | 3/2011 | Dobrowski et al. | |
| 7,908,037 B2 | 3/2011 | Nerone et al. | |
| 7,925,384 B2 | 4/2011 | Huizenga et al. | |
| 8,138,690 B2 | 3/2012 | Chemel et al. | |
| 8,143,811 B2 | 3/2012 | Shloush et al. | |
| 8,159,156 B2 | 4/2012 | Henig et al. | |
| 8,227,731 B2* | 7/2012 | Hick et al. | 250/205 |
| 8,232,745 B2 | 7/2012 | Chemel et al. | |
| 8,253,340 B2 | 8/2012 | Paton | |
| 8,280,558 B2 | 10/2012 | Picco | |
| 8,364,325 B2 | 1/2013 | Huizenga et al. | |
| 8,368,321 B2 | 2/2013 | Chemel et al. | |
| 8,370,722 B2 | 2/2013 | Sims et al. | |
| 8,373,362 B2 | 2/2013 | Chemel et al. | |
| 8,410,706 B2 | 4/2013 | Steiner et al. | |
| 8,417,388 B2 | 4/2013 | Altonen et al. | |
| 8,436,541 B2 | 5/2013 | Olson | |
| 8,436,542 B2 | 5/2013 | Middleton-White et al. | |
| 8,446,102 B2 | 5/2013 | Leinen | |
| 8,450,944 B2 | 5/2013 | Joseph | |
| 8,451,116 B2 | 5/2013 | Steiner et al. | |
| 8,485,703 B2 | 7/2013 | Eckel et al. | |
| 8,538,596 B2 | 9/2013 | Gu et al. | |
| 8,543,249 B2 | 9/2013 | Chemel et al. | |
| 8,552,664 B2 | 10/2013 | Chemel et al. | |
| 2006/0091822 A1 | 5/2006 | Bierman et al. | |
| 2006/0256067 A1* | 11/2006 | Montero et al. | 345/102 |
| 2006/0272208 A1* | 12/2006 | Altman et al. | 47/66.1 |
| 2007/0185675 A1* | 8/2007 | Papamichael et al. | 702/85 |
| 2007/0211446 A1* | 9/2007 | Veskovic | 362/1 |
| 2007/0273307 A1 | 11/2007 | Westrick et al. | |
| 2009/0278479 A1 | 11/2009 | Platner et al. | |
| 2010/0045191 A1 | 2/2010 | Aendekerk | |
| 2010/0110706 A1 | 5/2010 | Eckel et al. | |
| 2010/0176733 A1 | 7/2010 | King | |
| 2010/0194287 A1 | 8/2010 | Vivero-Flores et al. | |
| 2010/0244706 A1 | 9/2010 | Steiner et al. | |
| 2010/0264846 A1 | 10/2010 | Chemel et al. | |
| 2010/0277107 A1 | 11/2010 | Baaijens et al. | |
| 2010/0289412 A1 | 11/2010 | Middleton-White et al. | |
| 2010/0301769 A1 | 12/2010 | Chemel et al. | |
| 2011/0031897 A1 | 2/2011 | Henig et al. | |
| 2011/0161844 A1 | 6/2011 | Brindle et al. | |
| 2011/0178650 A1* | 7/2011 | Picco | 700/295 |
| 2011/0202151 A1 | 8/2011 | Covaro et al. | |
| 2011/0221350 A1 | 9/2011 | Staab | |
| 2013/0229115 A1 | 9/2013 | Pandharipande et al. | |

FOREIGN PATENT DOCUMENTS

| | | |
|---|---|---|
| WO | 2009100762 | 8/2009 |
| WO | 2009121082 | 10/2009 |
| WO | 2009121619 | 10/2009 |
| WO | 2009129232 | 10/2009 |
| WO | 2010033191 | 3/2010 |
| WO | 2010048652 | 5/2010 |
| WO | 2010086757 | 8/2010 |
| WO | 2010131158 | 11/2010 |
| WO | 2011044341 | 4/2011 |
| WO | 2011056225 | 5/2011 |
| WO | 2011123920 | 10/2011 |
| WO | 2011140090 | 11/2011 |
| WO | 2011149838 | 12/2011 |
| WO | 2012063149 | 5/2012 |
| WO | 2012129243 | 9/2012 |
| WO | 2012140152 | 11/2012 |
| WO | 2013101766 | 7/2013 |

OTHER PUBLICATIONS

F. Rubinstein, G. Ward, and R. Verderber; "Improving the Performance of PhotoElectrically Controlled Lighting Systems"; Presented at the Illuminating Engineering Society Annual Conference, Minneapolis, MN, Aug. 7-11, 1988; Published in the Proceedings; available at http://btus.lbl.gov/sites/all/files/24871_0.pdf (among many other websites).

Wayne Morrow; "Personal Environments and Productivity in the Intelligent Building"; Intelligent Building Institute Intellibuild 95; Atlanta, Georgia; Jun. 6, 1995; available at http://starfieldcorp.com/pdf/publications/Personal%20Environments.pdf.

* cited by examiner

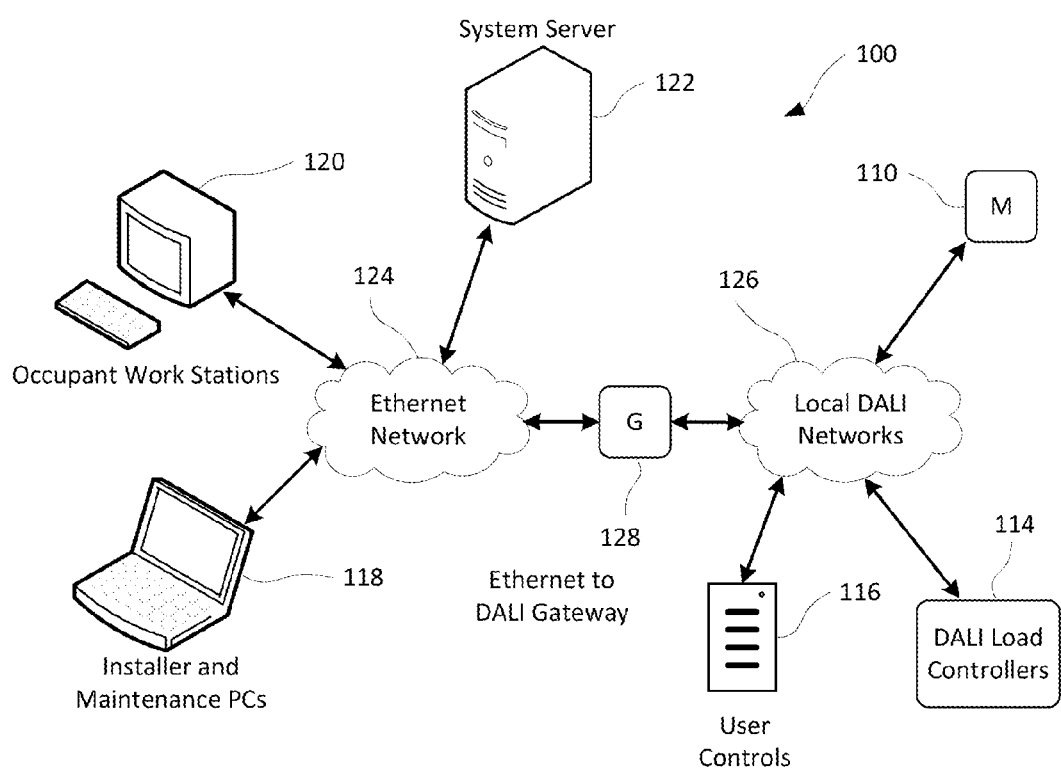
Fig 1 – System Deployment Diagram

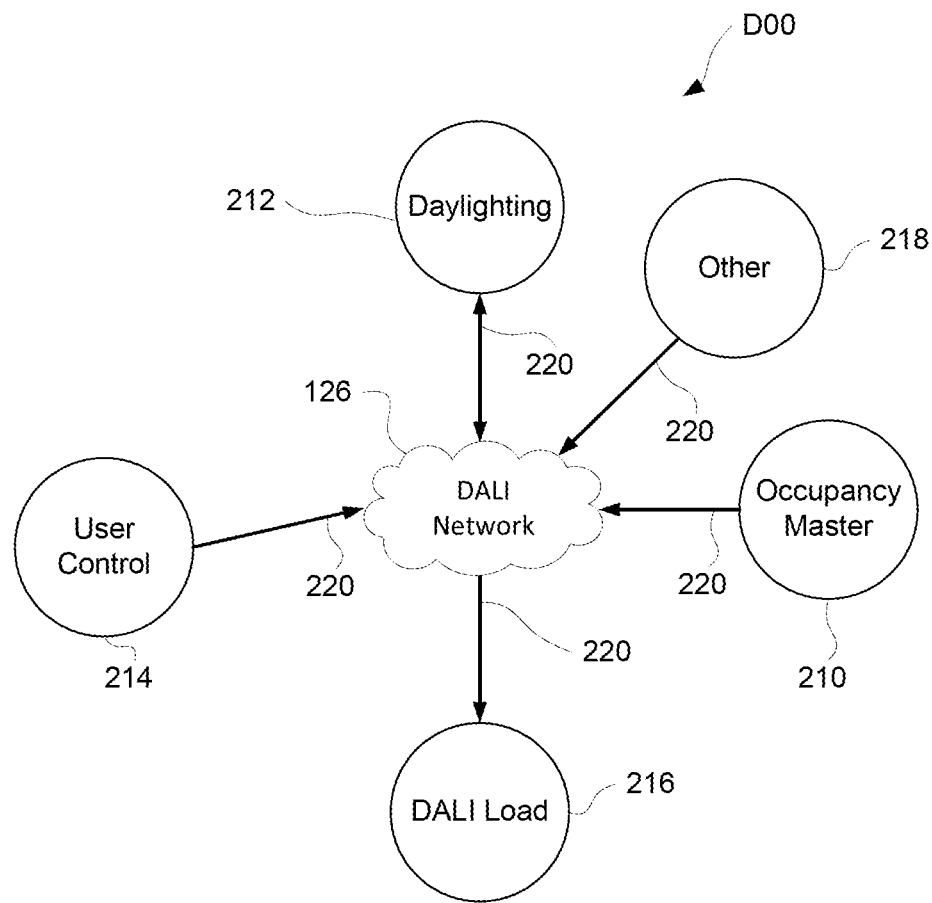
Fig 2 – Single Zone Object Interaction Diagram

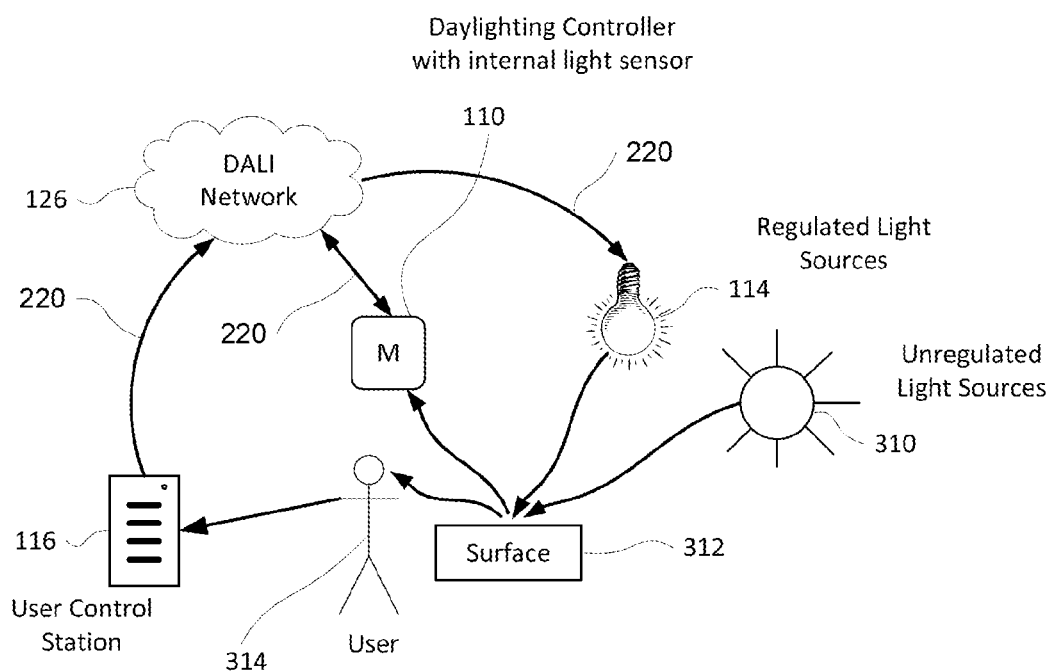
Fig 3 – Calibration and Setpoint Capture Process Diagram

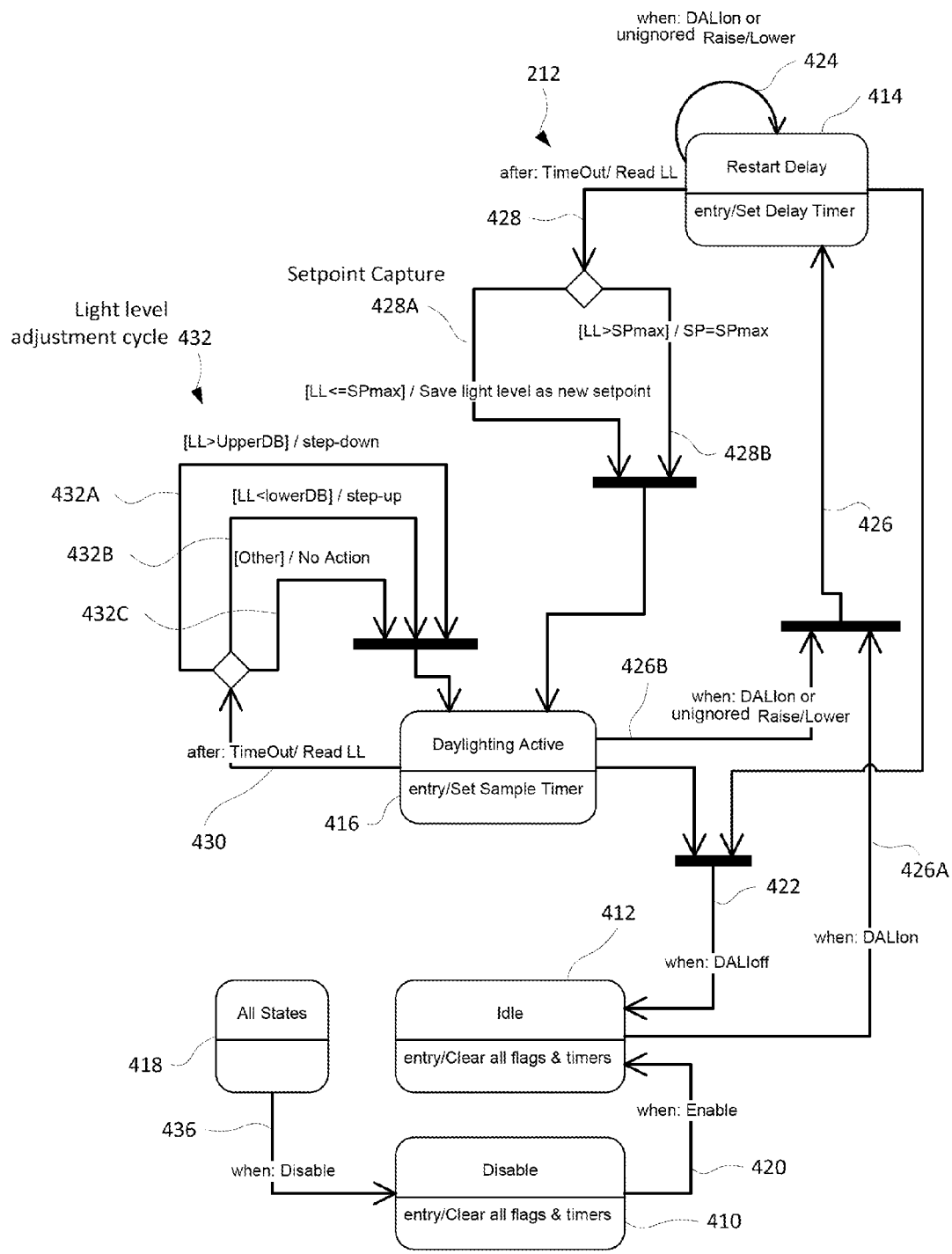
Fig 4 – Daylighting Object State Diagram

SELF CALIBRATING, ADAPTIVE SETPOINT DAYLIGHTING

BACKGROUND OF INVENTION

1. Field of the Invention

The present invention relates generally to lighting control systems and the regulation of lighting loads to maintain a constant light level in order to reduce energy use when natural light is available which process is generally known as daylighting or daylight harvesting.

2. Description of the Related Art

Daylighting is simple in principal but has traditionally been problematic in execution. The basic concept is to maintain a constant light level or setpoint in a space in the same way that a thermostat maintains a constant temperature setpoint.

Light sources in a given space are either controlled or uncontrolled. Uncontrolled light is generally contributed by natural sources like the sun while controlled sources are electric lights or mechanisms that can be operated to modulate the amount of light coming into a space. As the light level from uncontrolled sources changes the daylighting system increases or decreases the output of the controlled sources to maintain a constant light level. This is done by using either open or closed loop control. Open loop operates without feedback while closed loop has feedback. Open loop has the advantage of not being affected by local conditions such as window shades and changing surface reflectance of room surfaces while closed loop is affected by local conditions. In areas like public spaces where local conditions are effectively static open loop can be effective. However, in offices, classrooms, and other spaces where room and use conditions are not static, closed loop control is needed to be able to respond to changing conditions and user needs.

Thermostats are a good example of a closed loop system. The thermostat measures temperature in a space and then compares that temperature to a setpoint value. If the thermostat is controlling a heat source a measured temperature greater than the setpoint means the space is too hot and the heat source is turned off or reduced. If the temperature is below the setpoint then the heat source is activated or increased to raise the temperature. Daylighting works much the same way by comparing a measured light level against a light level setpoint. If the light level is above the setpoint the controllable light source is decreased and if it is below the setpoint the light source is increased. Excessive cycling in both systems is managed by establishing a dead band around the setpoint that creates a window within which no adjustment occurs.

However, in other ways heat and light are very different. Air temperature is slow to respond to heat or cooling sources and given a space with reasonable air circulation, air temperature will be about the same throughout the space. Light, however, is directional and immediate so light level can change quickly and vary widely depending on where it is measured. Consequently, light sensors must be placed in the area they are controlling and then calibrated for that specific location.

All things being equal, the best placement for a daylighting light sensor is at the work surface of the zone being controlled. However, for several reasons this is generally not practical. The next best location is typically on the ceiling where the sensor is protected and has a good field of view. In theory this works well except that a ceiling mounted light sensor relies on reflected light and is generally inaccessible to users. Reflected light is a problem because it depends on the reflectance of room surfaces which can change quickly with user activity. Inaccessibility is a problem because it limits the user's ability to tune the system to meet changing use and environmental conditions. The user point of control could be moved to a more accessible location but this is typically considered too expensive and setting a light level is not as intuitive as setting a temperature setpoint.

Prior art daylighting systems have managed this problem by providing a work around. Instead of allowing users to adjust the light level setpoint directly the solution has been to provide a fixed setpoint together with an independent means for users to control light level. With dimmable light sources users are free to adjust their lights to any level within the dimming range. However, user adjustable light levels are inherently incompatible with basic fixed setpoint daylighting. Prior-art, closed loop daylighting systems have solved this problem by creating an asymmetrical dead band around the fixed setpoint. Daylighting engages whenever the measured light level is greater than the setpoint but daylighting below the setpoint is eliminated. This gives users the freedom to set a light level to any value below the setpoint but at the cost of eliminating daylight harvesting until the light level increases above the setpoint.

Ignoring the loss in energy savings, prior art daylighting has several additional problems. The first is light sensor calibration. Occupied work spaces are rarely static. Furniture is moved, clothing changes, desk surfaces become cluttered, and light sources deteriorate and fail. All these factors affect the amount of light reaching the light sensor. A good example is a room with dark carpet and moveable white desks. Moving the desks can quickly and significantly change the room reflectance which in turn can have an immediate and significant effect on the amount of light reaching the light sensor. Prior art systems typically manage this problem by providing a means for a maintenance person to reset and recalibrate the system but this approach is both inconvenient for users and expensive for maintenance departments.

A second major problem is light sensor placement. Prior art daylighting systems work by maintaining a static setpoint. This works well as long as the light sources are also static. However, daylight comes from the sun and the sun position changes with the seasons. A light sensor calibrated for the winter can be overwhelmed in summer. The prior art solution has been to locate the sensor so that the daylight contribution is relatively constant over the year. To aid in this calculation the California Energy Commission funded development of a light sensor placement program called SPOT which stands for Sensor Placement Optimization Tool. The tool is free and downloadable from the Internet but modeling is time intensive and challenging. Instead, sensors are typically located by general placement guidelines which are often not well understood or easy to enforce.

Sensor placement is also restricted by bleed light from non-daylighting zones. Sensors in smaller rooms with only a single control zone are not a problem but in larger spaces like classrooms daylighting and non-daylighting zones can be side by side. Light bleeding into the daylighting zone from a non-daylighting zone will affect daylighting operation. Light sensors can be adjusted to accommodate bleed light but only if the bleed light source is constant. However, in systems with user adjustable light levels bleed light is not constant. Prior art systems work around this problem by requiring the light sensor to be placed where bleed light into the controlled zone is insignificant.

These two placement restrictions are difficult enough but there are still further restrictions. These include non-physical items like the upward light from pendant fixtures as well as the numerous physical items that populate a ceiling including light fixtures, fire sprinklers, air registers, and audio visual projectors. Taken together, finding space to properly locate a prior art light sensor can be challenging.

Thusly, what is needed is a new approach that maximizes daylighting energy savings, quickly responds to changing room conditions, has fewer sensor placement restrictions, and operates with minimal maintenance support.

SUMMARY OF THE INVENTION

The present invention maximizes daylighting energy savings by providing daylighting at all user settings, has fewer sensor placement restrictions, and operates with minimal maintenance support. It does this by recalibrating the light sensor and capturing a new daylighting setpoint each time the light level is adjusted.

Prior art daylighting systems use a static setpoint that is set by someone other than the typical user. When a user adjusts the light level, the setpoint does not change resulting in a static system operating in a dynamic world. The present invention resolves this problem by tapping into the information generated each time the light level is adjusted. When users select their preferred light level, they become part of a feedback loop. They look at the room and adjust the light level until a preferred light level is reached. This would not work for setting temperature because of long lag times but it does work for light because the response to adjustments is immediate.

In performing this operation, users become part of a highly effective feedback loop that integrates multiple light sources while compensating for glare, lamp color, window shades, lumen depreciation, surface reflectance, and any other condition that affects the user's perception of room brightness. The present invention takes advantage of this by measuring the light level after each adjustment cycle and then savings that light level as the new daylighting setpoint. The invention accomplishes this by listening for lighting adjustment commands that are created during the process.

In a networked lighting system, adjustment commands are created each time the light level is adjusted. There are only a finite number of these commands and they must be addressed to the specific zone being controlled. The daylighting controller can use this information to know what commands and addresses to listen for. When any of these commands are detected, the controller is then able to use its stored knowledge to determine that the light level is being adjusted and to determine if the lights sources are on or off.

When the adjustment process begins, the controller of the present invention suspends daylighting until the adjustments have stopped and the lights have settled to their new level. The controller then reads the light level and records this as the new setpoint. Through this process, the light sensor is calibrated to compensate for current conditions. As conditions change, the user is free to repeat the process as often as needed. Window shades may be opened or closed, light sources may fail or deteriorate, and furniture may be moved. It's all the same. The use maintains the daylighting system through the intuitive and well understood act of adjusting the light level.

An additional advantage of the present invention is better management of DALI ballasts and similar devices with fade. DALI commands that include fade do not turn lights on or off immediately. Instead, a light level command begins a fade period. Any adjustment commands, including daylighting adjustments received during the fade period, stops fade and prevents the lights from reaching their intended output level. The preferred embodiment of the present invention prevents this from happening by immediately suspending daylighting whenever the lights are turned off, on, or adjusted. After the fade process as completed and lamps have reached their full designated output, a new setpoint is captured and daylighting activated.

Another advantage of the present invention is daylighting in public spaces. The use of dimmable light sources in public areas like corridors and lobbies is becoming increasingly common. Dimming sources allow light levels to be varied in response to daylighting adjustments as well as time of day, egress, and other criteria. With prior art daylighting systems the only way to lower a light level is to suspend daylight or somehow change the setpoint. The present invention resolves the problem by making the process automatic. When a light level is lowered by a schedule or other means, the present invention automatically compensates by capturing a new setpoint. Operation is simplified, energy savings are retained, and maintenance is reduced by making the operation of public spaces intuitive and consistent.

Lower cost is another advantage of the present invention. Widespread adoption of daylighting has lagged for many reasons but high perceived cost is a significant one. Adding daylighting to an occupancy sensor can be done at a low marginal cost but prior art restrictions on light sensor placement discussed above have generally kept occupancy and daylighting devices separate. The present invention's relaxed placement restrictions solve this problem allowing a one device to house both occupancy and daylighting which significantly reduces both equipment and installation costs.

Although the present invention has been described in relation to particular embodiments thereof, many other variations, modifications, and other uses will become apparent to those skilled in the art. It is preferred, therefore, that the present invention be limited not by the specific disclosure herein, but only by the appended claims.

BRIEF DESCRIPTION OF THE DRAWINGS

FIG. 1—Simplified System Deployment Diagram showing a complete system including a plurality of local DALI networks connected together via a high speed Ethernet backbone network.

FIG. 2—Single Zone Object interaction Diagram showing how the networked objects of a single zone interact to accomplish daylighting.

FIG. 3—Simplified diagram of the Calibration and Setpoint Capture Process shows how a user becomes an active part of the calibration process through the act of adjusting light level.

FIG. 4—Daylighting Object State Diagram graphically describes the daylighting algorithm of the present invention.

The foregoing summary, as well as the following detailed description of the preferred embodiment, is better understood when read in conjunction with the appended drawings. For the purposes of illustrating the invention, there is shown in the drawings an embodiment that is presently preferred, in which like numerals represent similar parts through the several views of the drawings, it being understood, however, that the invention is not limited to the specific methods and embodiments disclosed.

DETAILED DESCRIPTION OF THE INVENTION

FIG. 1 is a simplified system deployment diagram of the preferred embodiment of the present invention showing the primary physical elements. These elements consist of components connected to local DALI networks 126 and remote components connected to an Ethernet backbone network 124. Remote components consist of a plurality of user and user surrogate devices such as occupant work stations 120, installer and maintenance PCs 118, system servers 122, and other devices that can send and receive messages over the Ethernet network 124. Local components consist of a plurality of sensors 110, user controls 116, and DALI compliant load controllers 114 connected to local DALI networks. Local and remote networks are connected together via gateway devices 128 that allows messages to pass between the two networks.

Each physical component is a network node with the capacity to interact with the network and to store and run computer instructions. These computer instructions are typically bundled together into discrete firmware packages called objects and each object is a discrete instance of a set of common instructions and properties called a class. Within the system there may be any number of objects hosted by any number of nodes with each node capable of hosting one or many objects.

User interface devices 116 are nodes that contain buttons, touch screens, and other physical means that allow users to locally communicate with the system. Sensor devices 110 are nodes that contain one or more transducers to monitor sound, temperature, motion, and light phenomena. DALI loads controllers 114 are nodes that host a DALI load control object and a means for modulating an electrical load. Examples of DALI load control nodes include dimming ballasts, incandescent dimmers, DALI to 0-10 v gateways, and digital outputs connected to relays. These devices may be stand alone or included with other nodes.

FIG. 2 is a simplified object interaction diagram showing how the objects of a single zone interact. Objects are the operating elements of the system. Each object must be hosted by a physical node and each node may host a plurality of objects. The diagram shows a single control zone representing a plurality of possible zones. It includes a plurality of user controls 214, other undefined control objects 218, and DALI load control objects 216 all interacting with a single daylighting object 212 and a single occupancy control object 210 via a shared DALI network 126.

Each object is independent and has the ability to send and receive messages over the local network 126. In the preferred embodiment the messages conform to the DALI protocol and are categorized as DALIon, DALIoff, Raise/Lower (aka Increment up/down), or Ignored commands 220. DALIon commands definitively instruct the DALI load objects to switch on at a predefined level while DALIoff commands definitively instruct them to turn off. Raise/Lower commands instruct load objects in their "on" state to increase or decrease their current output, Ignored commands include the Increment-up (step-up) and Increment-down (step-down) commands used for daylighting adjustments and step-on-and-up and the step-down-and-off commands, which do not result in a definitive on/off state. Scene commands are supported but are restricted to "on" operations to allow them to be processed as DALIon commands. Increment up and down and similar commands that do not affect the on-state of the load objects are ignored (that is, "Ignored commands") but can still be employed by user controllers 214 as long as they are used in conjunction with an applicable recognized command.

Messages may be addressed to individual objects, groups of objects, or broadcast to all objects but zones are typically defined by a unique group address. DALIon and DALIoff commands include both the command itself and a zone address. Each object within the zone must be configured to use and recognize the zone address. Additionally, zones can be hierarchical meaning that objects within the zone may also belong to multiple nested zones. Hierarchical zones may be used for global activities such as switching off all offices within a building at a particular time of day.

Objects generally have the ability to both receive and transmit messages but in this embodiment user controls 214 only transmit commands while the daylighting and occupancy control objects both receive and transmit commands. Additionally, objects like daylighting 212 and the occupancy master 210 operate as user surrogates meaning that they simulate user-like activities through the use of algorithms. Other objects 218 are any other user or user surrogate object operating locally or remotely that has the capacity to transmit DALI commands to the zone.

DALI is an asynchronous protocol meaning that delivery of messages is not verified nor is it possible to determine the origin of messages. In practice this means that the daylighting object defined herein will respond equally to any DALIon or DALIoff message whether created by a user or user surrogate. Synchronous message protocols not described here could be used to expand operation by allowing objects to be configured to respond to specific devices or classes of devices and services.

The present invention uses these capacities to create a family of interacting objects. In the preferred embodiment local objects 210, 212, 214 as well as similar remote or local other objects 218 all have the capacity to regulate DALI load objects 216 by sending light-level adjustment commands 220 to a common zone address. DALI load objects that have been configured to listen for these messages accept and process the commands in accordance with the DALI standard and then regulate their connected loads accordingly.

FIG. 3 is a simplified diagram of the closed-loop light sensor calibration and setpoint capture process. The process begins with two light sources 310 and 114. Item 114 represents electric lights and other regulated sources while item 310 represents the sun and other unregulated sources. Light rays from both sources enter the control zone and reflect off room surfaces 312. The reflected light and some direct light from both sources, not shown, is detected by a light sensor inside the sensor device 110 and by a user 314 in the same space. The user 314 evaluates the data and manipulates the light level control device 116 to adjust the light level in the space. As the user control device 116 is manipulated, it sends out light level adjustment commands 220 to the local DALI network 126. As the commands reach the network 126, both the daylighting controller 110 and the DALI loads 114 receive and interpret the commands. The DALI commands 220 tell the regulated light sources to modulate their light output which in-turn affects the amount of light reaching the user 314. This process creates a feedback loop that allows a user 314 to continue the adjustment process until a desired light level is attained. While this is happening, the daylighting controller 110 is also listening to and interpreting the commands 220 but as described in the FIG. 4 narrative, daylighting itself is suspended.

FIG. 4 is a simplified state diagram of the daylighting control object 212. The state diagram defines the object's operating algorithm which has four states: disabled 410, idle 410, restart delay 414, and daylighting active 416. States are maintained until an event occurs and an action is implemented. Events include timeouts and the receipt of commands while actions include sending commands, starting and stopping timers, and changing to a new state. The diagram uses Unified Modeling Language (UML) notation that prefaces events with a colon ":" and actions with a forward slash "/".

All the daylight control objects have the same operating algorithm but each may be customized with property settings. Property settings for this embodiment are upper deadband (upperDB), lower deadband (lowerDB), adjustment time period, restart delay time, daylighting setpoint (SP), and setpoint max (SPmax). UpperDB and lowerDB bracket the daylighting setpoint to prevent excessive cycling and to allow asymmetrical setpoint control.

Adjustment time period is the time between daylighting adjustments. A short period speeds up daylighting while a longer period slows it down. With different settings the daylighting process can be made fast enough to be observed or low enough to become imperceptible to users. Short period are typically used for testing while longer periods are used for normal operation. Additionally, longer periods in conjunction with the DALI exponential dimming curve have been used to create diurnal cycles with simulated sunrise and sunsets.

Restart delay sets the time period during which daylighting is suspended. It needs to be long enough to allow the light sources to come to their full operating output and for a given user adjustment cycle to be completed.

The first four properties are not dependent on room conditions which often allows them to be set to default values. The last two, however, are determined by light readings which are dependent on room conditions and sensor placement. SP is reset automatically each time the light level is adjusted so manual configuration is not required or allowed. SPmax is the highest allowed value for SP and needs be set through a calibration process. The typical way to do this is to bring the electric lights to a known output value and then set or capture SPmax as a percentage of LL. The value of SPmax is not critical to the operation of the daylighting controller so it is typically set high enough to allow the electric lights to reach their full output and to accommodate expected variations in use, room reflectance, and sun angle.

The daylighting object 212 begins operation in the disabled state 410. Nothing happens until the object is enabled 420 by an enable command whereupon the object moves to its idle state 412. Upon entry into the idle state 412 the object is initialized by clearing all flags and timers. The object stays in the idle state until it either receives a disable command 436 or a DALIon command 426A.

When a DALIon command 426A is detected, the object 212 changes to the restart delay state 414 wherein the delay timer 414 is set to the restart delay period. Each time another DALIon or unIgnored Raise/Lower command 424 is received the restart delay timer is reset. While in this state 414, daylighting is suspended to prevent interference with other commands and processes. The state 414 is maintained until the restart delay timer times out 428 or a DALIoff command is received 422.

Timeout of the restart delay initiates the change the conditional action to capture a new daylighting setpoint, SP 428. The setpoint capture process 428 begins by first reading the current ambient light level value, LL. If LL is less than or equal to SPmax then LL becomes the new SP value 428A. If LL is greater than SPmax then SPmax becomes the new SP value 428B. Limiting LL to be less than or equal to SPmax assures that energy savings are achieved even when SP is being captured in a bright daylighted space. Additionally, lower SPmax values have been used to restrict the output of light sources in overlit spaces.

After completing setpoint capture 428 the object enters the daylighting active state 416. Upon entry, the daylighting adjustment timer is set to the daylighting adjustment time period. The object remains in this state until the adjustment period times out 430, or DALIon or unIgnored Raise/Lower command 426B is received, or a DALIoff 422 command is received. If a DALIon or unIgnored Raise/Lower command is received 426B the object stops the adjustment timer and returns to the restart delay state 414. If the daylight adjustment period times out 430 the object begins the light level adjustment process 432 by first reading LL. If LL is above SP plus upperDB the objects sends a Step-Down command to decrement light output 432A. If LL is below SP less lowerDB the object sends a Step-Up command 432B. If LL is between the two deadbands 432C no action is taken. The object then returns to the daylighting active state 416 wherein the daylighting adjustment timer is reset and the adjustment cycle begins again.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method to dynamically capture a new setpoint for a daylighting-control zone, the method performed by a daylighting controller, said daylighting controller having at least one daylighting-control object, and comprising the steps of:
   listening for a light-level-adjustment command being transmitted to one or more lighting-load-control objects controlling light sources in said daylighting-control object's control zone;
   categorizing said light-level-adjustment command as On, Off, Raise/Lower, or Ignored;
   when an applicable On or Raise/Lower command is detected, starting a setpoint-capture cycle;
   suspending the daylighting operation of said daylighting-control zone until said setpoint-capture process has completed;
   waiting for the current light-level-adjustment cycle to complete or be cancelled; and
   when the current light-level-adjustment cycle has completed, reading and then writing the currently sensed light level of said daylighting-control object's control zone as the new setpoint of said daylighting-control object;
   wherein:
   no commands or other daylighting messaging listened for by said daylighting-control object within said daylighting-control zone need be processed through a central server or central processor, and
   said daylighting controller can respond and operate autonomously and automatically throughout said setpoint-capture process without any manual user control to take said daylighting controller out of its normal mode of operation.

2. The method of claim 1, wherein said new setpoint must be less than or equal to a maximum-allowed setpoint value.

3. The method of claim 1, wherein said step of listening for a light-level-adjustment command is performed by passively and continuously monitoring all communications on a local lighting-control network to which all said local control devices and load controllers are connected.

4. The method of claim 3, wherein said light-level-adjustment commands and associated communications comply with the DALI message protocol.

5. The method of claim 1, wherein if said daylighting-control object categorizes said light-level-adjustment command as On, or Raise/Lower, then said step of responding to the detection of an applicable On or Raise/Lower command further includes cancelling any ongoing daylighting activity before starting a setpoint-capture cycle.

6. The method of claim 1, wherein said light-level-adjustment commands may originate from user or user-surrogate devices, which are connected to either local or remote networks.

7. The method of claim 1, further comprising the step of, if an applicable Off command is detected while said daylighting control is not in an idle state, then immediately canceling any ongoing daylighting activity and returning said daylighting-control object to its idle state.

8. The method of claim 1, wherein the length of said setpoint-capture cycle is determined by a delay timer that is reset each time an On or Raise/Lower command is detected and/or when the sensed light level becomes nominally stable.

9. The method of claim 1, wherein said step of reading said current light level may be performed by reading and then averaging the sensed light level of additional peripheral light sensors to achieve a single common ambient level for said daylighting-control zone.

10. The method of claim 1, wherein: said daylighting-control object changes to a run state immediately after said writing of said new daylighting setpoint; and incremental adjustment commands are periodically and asynchronously transmitted to lighting-load-control objects controlling regulated light sources affecting the light level of said daylighting-control zone as needed to maintain said daylighting setpoint and as allowed by the output range of said lighting-load controllers.

11. The method of claim 10, wherein the rate of daylighting adjustment is determined by a variable that sets the time delay between adjustments.

12. The method of claim 10, wherein said regulated light sources include both electric lights and modulated sources of natural light.

13. A daylighting-control device configured to maintain a user or user-surrogate determined light level in a daylighting-control zone comprising:
   a means for listening for messages being transmitted via a communications network;
   a means for reading, interpreting, and categorizing said messages;
   a means for sensing the current ambient light level of said daylighting-control zone;
   a means for automatically suspending the daylighting operation of said daylighting-control device until a light-level-adjustment process has completed or has been cancelled;
   a means for reading and then storing said ambient light level value as the setpoint of said daylighting-control device when a current light-level-adjustment cycle has completed;
   a means for reading and comparing said ambient light level to said setpoint value; and
   a means for transmitting light-level-adjustment commands;
   wherein:
      no commands or other daylighting messaging listened for by said daylighting-control device on said communications network need be processed through a central server or central processor, and
      said daylighting-control device can respond and operate autonomously and automatically throughout said setpoint reading and storing process without any manual user control to take said daylighting-control device out of its normal mode of operation.

14. The device of claim 13, wherein said means for sensing said current ambient light level includes one or more light-sensing devices located throughout said daylighting-control zone and connected via said communications network.

15. The device of claim 13, wherein said communications network is a digital-lighting-control network that conforms to the DALI standard.

16. The device of claim 13, wherein all physical components of the light-level-control system are hosted within a single physical node.

17. The device of claim 13, wherein the physical components of the light-level-control system are hosted by separate physical nodes connected via said communications network.

* * * * *